(12) United States Patent
Gress et al.

(10) Patent No.: US 7,822,815 B1
(45) Date of Patent: Oct. 26, 2010

(54) UNIFIED MESSAGING FEATURE THAT PLAYS GREETINGS BASED ON THE RECEIVED CALLING PARTY NUMBER

(75) Inventors: David S. Gress, Mechanicsville, VA (US); Robert Raymond Sealey, Brighton (AU); Thomas Bryant Sealey, II, Glen Allen, VA (US)

(73) Assignee: Cisco Technology, Inc., San Jose, CA (US)

( * ) Notice: Subject to any disclaimer, the term of this patent is extended or adjusted under 35 U.S.C. 154(b) by 1950 days.

(21) Appl. No.: 09/633,899

(22) Filed: Aug. 7, 2000

(51) Int. Cl.
*G06F 15/16* (2006.01)

(52) U.S. Cl. .............. 709/206; 709/220; 709/228; 379/207.15

(58) Field of Classification Search .......... 709/203, 709/204, 206, 218, 220, 224, 225, 227, 228, 709/229, 231; 379/265.09, 209.1, 211.01, 379/207, 211, 207.15, 209.01; 370/389, 370/349, 352, 353, 380; 380/23
See application file for complete search history.

(56) References Cited

U.S. PATENT DOCUMENTS

| | | | |
|---|---|---|---|
| 4,837,798 A | 6/1989 | Cohen et al. ............... 709/203 |
| 5,276,731 A | 1/1994 | Arbel et al. | |
| 5,581,604 A | 12/1996 | Robinson et al. | |
| 5,726,984 A * | 3/1998 | Kubler et al. ............... 370/349 |
| 5,768,382 A * | 6/1998 | Schneider et al. ............. 380/23 |
| 5,867,821 A * | 2/1999 | Ballantyne et al. ............ 705/2 |
| 5,870,549 A * | 2/1999 | Bobo, II ..................... 709/218 |
| 5,974,131 A | 10/1999 | Malik ......................... 709/224 |
| 5,996,006 A * | 11/1999 | Speicher ..................... 709/218 |
| 6,038,305 A | 3/2000 | McAllister et al. | |
| 6,243,376 B1 * | 6/2001 | Ng et al. ..................... 370/352 |
| 6,345,294 B1 * | 2/2002 | O'Toole et al. ............. 709/222 |
| 6,385,306 B1 * | 5/2002 | Baxter, Jr. ................ 379/88.13 |
| 6,807,565 B1 * | 10/2004 | Dodrill et al. ............... 709/206 |
| 6,823,047 B1 * | 11/2004 | Cruickshank ............ 379/88.18 |
| 6,970,906 B1 * | 11/2005 | Parsons et al. .............. 709/204 |
| 7,082,469 B2 * | 7/2006 | Gold et al. .................. 709/231 |
| 2003/0147518 A1 * | 8/2003 | Albal et al. ............ 379/207.15 |

* cited by examiner

*Primary Examiner*—Khanh Q Dinh
(74) *Attorney, Agent, or Firm*—Leon R. Turkevich; Edward J. Stemberger

(57) ABSTRACT

A messaging system is provided for playing a messaging prompt in response to a request for execution of a messaging operation. The request contains calling party number information. The messaging system includes an application runtime environment configured for retrieving for playback as the messaging prompt, a personalized voice message based on a match of the received calling party number information with calling party number information stored in an Internet Protocol (IP) based database server. The personalized voice message corresponds to the matched, stored calling number information of the calling party. Hence, a subscriber can record personalized greeting for preferred callers such that when a preferred caller reaches the subscriber's voice mail, the personalized greeting for that caller is played. If the caller is not a preferred caller, a generic greeting is played.

34 Claims, 5 Drawing Sheets

UNIFIED MESSAGING FEATURE THAT PLAYS GREETINGS BASED ON THE RECEIVED CALLING PARTY NUMBER

BACKGROUND OF THE INVENTION

1. Field of the Invention

The present invention relates to voice messaging systems and more particularly to enabling a subscriber to record a personalized voice message to be played as a messaging prompt for a specific calling party when the calling party reaches the subscriber's voice mail.

2. Description of Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

An open standards-based Internet protocol (IP) network, such as the World Wide Web, the Internet, or a corporate intranet, provides client-server type application services for clients by enabling the clients to request application services from remote servers using standardized protocols, for example hypertext transport protocol (HTTP). The web server application environment can include web server software, such as Apache, implemented on a computer system attached to the IP network. Web-based applications are composed of HTML pages, logic, and database functions. In addition, the web server may provide logging and monitoring capabilities.

In contrast to the public switched telephone network, the open standards-based IP network has enabled the proliferation of web based applications written by web application developers using ever increasing web development tools. Hence, the ever increasing popularity of web applications and web development tools provides substantial resources for application developers to develop robust web applications in a relatively short time and an economical manner. However, one important distinction between telephony-based applications and web-based applications is that telephony-based applications are state aware, whereas web-based applications are stateless.

In particular, telephony applications are state aware to ensure that prescribed operations between the telephony application servers and the user telephony devices occur in a prescribed sequence. For example, operations such as call processing operations, voicemail operations, call forwarding, etc., require that specific actions occur in a specific sequence to enable the multiple components of the public switched telephone network to complete the prescribed operations.

The web-based applications running in the IP network, however, are state-less and transient in nature, and do not maintain application state because application state requires an interactive communication between the browser and back-end database servers accessed by the browsers via a HTTP-based web server. However, an HTTP server provides asynchronous execution of HTML applications, where the web applications in response to reception of a specific request in the form of a URL from a client, instantiate a program configured for execution of the specific request, send an HTML web page back to the client, and terminate the program instance that executed the specific request. Storage of application state information in the form of a "cookie" is not practical because some users prefer not to enable cookies on their browser, and because the passing of a large amount of state information as would normally be required for voice-type applications between the browser and the web application would substantially reduce the bandwidth available for the client.

Commonly-assigned, copending application Ser. No. 09/480,485, filed Jan. 11, 2000, entitled Application Server Configured for Dynamically Generating Web Pages for Voice Enabled Web Applications, the disclosure of which is incorporated in its entirety herein by reference, discloses an application server that executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe any one of a user interface such as dynamic generation of a menu of options or a prompt for a password, an application logic operation, or a function capability such as generating a function call to an external resource. The application server then parses the XML page, and executes the operation described by the XML page, for example dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments.

Hence, web programmers can write voice-enabled web applications, using the teachings of the above-incorporated application Ser. No. 09/480,485, by writing XML pages that specify respective voice application operations to be performed. The XML documents have a distinct feature of having tags that allow a web browser (or other software) to identify information as being a specific kind or type of information. Hence, the XML documents define the application to be executed by the application server within the runtime environment, enabling voice enabled web applications to be generated and executed without the necessity of programming language environments.

One of the major disadvantages of typical telephony voice messaging is that it is impersonal by nature since every caller hears the same generic subscriber greeting. Currently, if a subscriber records a personalized greeting intended for a specific caller, anyone calling the subscriber will receive the personalized greeting. Hence, subscribers are limited to recording generic greetings for incoming calls.

SUMMARY OF THE INVENTION

There is a need for a voice messaging system that enables a subscriber to customize greetings and store the greetings in an open protocol directory to correspond with the identity of the calling party, such that when the calling party reaches the subscriber's voice mail, a personalized greeting is played as a messaging prompt.

These and other needs are attained by the present invention, where a messaging system is provided for playing a messaging prompt in response to a request for execution of a messaging operation. The request contains calling party number information. The messaging system includes an application runtime environment configured for retrieving for playback as the messaging prompt, a personalized voice message based on a match of the received calling party number information with calling party number information stored in an Internet Protocol (IP) based database server. The personalized voice message is stored in an IP based database server and corresponds to the matched, stored calling number information of the calling party.

One aspect of the present invention provides a method for playing a messaging prompt. The method includes receiving a request for execution of a prescribed messaging application operation. The request contains calling party number information. Stored calling party number information is accessed from an Internet Protocol (IP) based database server configured for storing calling party number information. The received calling party number information is compared to the stored calling party number to determine if there is a match between the received calling party information and the stored calling party information. Based on a determined match, a personalized voice message corresponding to the matched, stored calling party number information is retrieved for playback as the messaging prompt.

Hence, a subscriber can record personalized greetings for preferred callers such that when a preferred caller reaches the subscriber's voice mail, the personalized greeting for that caller is played. If the caller is not a preferred caller, a generic greeting is played.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
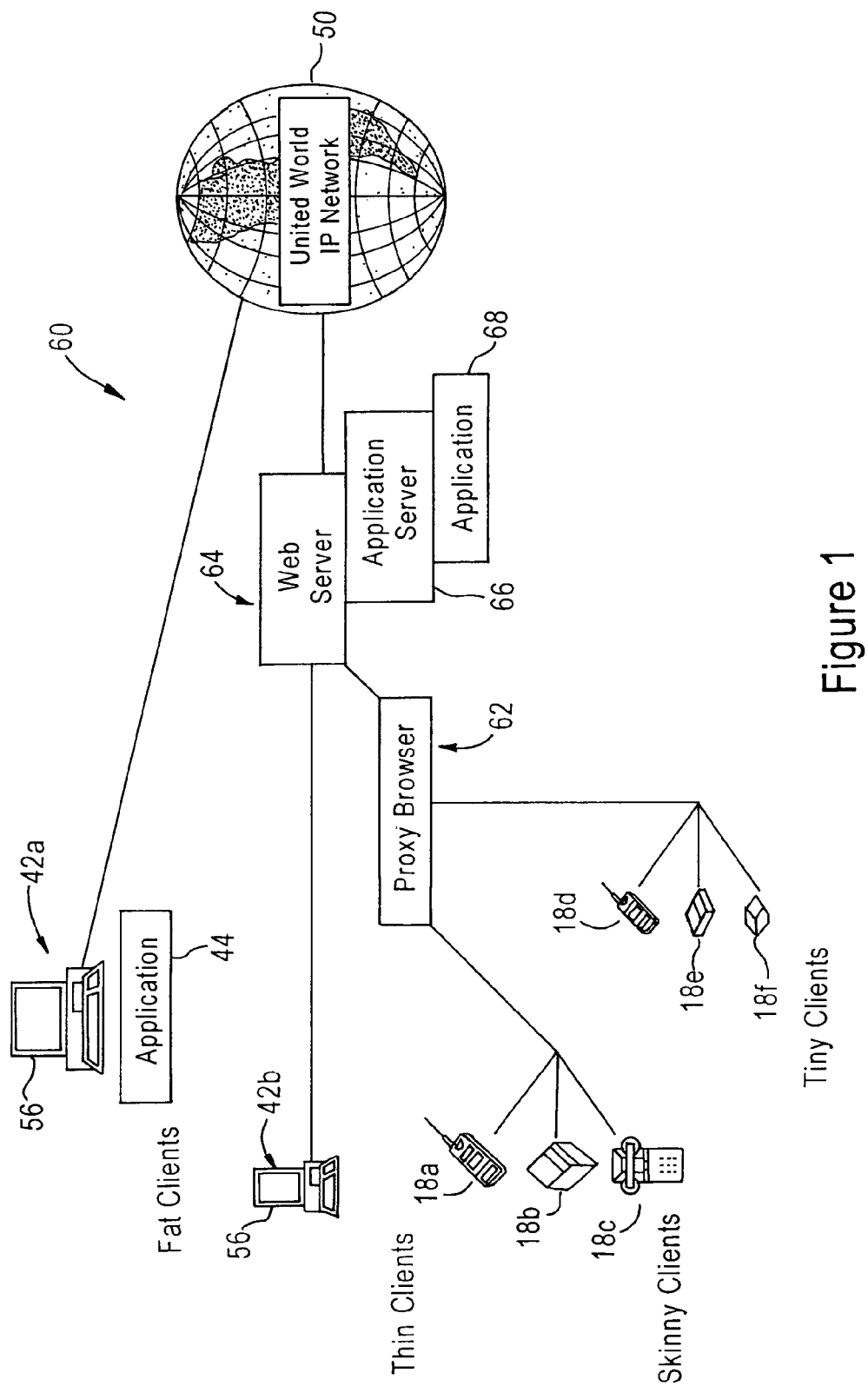
FIG. 1 is a block diagram illustrating an system enabling deployment of a unified messaging system, capable of executing voice enabled web applications, according to an embodiment of the present invention.
Figure 3:
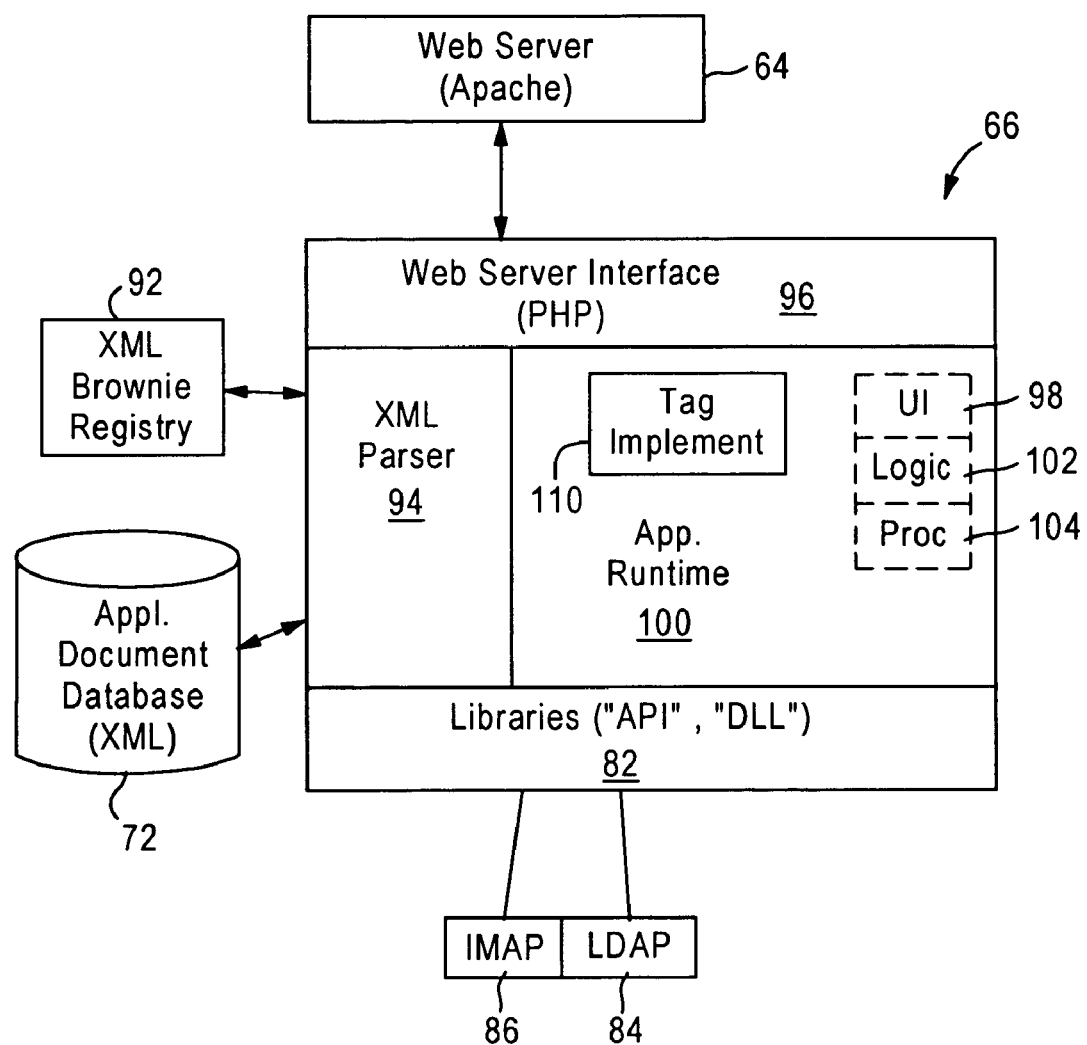
FIG. 3 is a diagram illustrating in detail the application server of FIGS. 1 and 2 according to an embodiment of the present invention.

FIG. 1 is a block diagram illustrating an architecture that provides unified voice messaging services and data services via an IP network using browser audio control according to an embodiment of the present invention, reproduced from FIG. 3 of the above-incorporated application Ser. No. 09/480,485. The clients 42a and 42b, referred to herein as "fat clients" and "thin clients", respectively, have the distinct advantage that they can initiate requests using IP protocol to any connected web server 64 to execute part or most of the applications 44 on behalf of the clients. An example of a fat client 42a is an e-mail application on a PC that knows how to run the application 44 and knows how to run the IP protocols to communicate directly with the messaging server via the packet switched network 50. An example of a thin client 42b is a PC that has a web browser; in this case, the web browser 56 can use IP protocols such as HTTP to receive and display web pages generated according to hypertext markup language (HTML) from server locations based on uniform resource locators (URLs) input by the user of the PC.

As shown in FIG. 1, each of the clients (tiny clients, skinny clients, thin clients and fat clients) are able to communicate via a single, unified architecture 60 that enables voice communications services between different clients, regardless of whether the client actually has browser capabilities. Hence, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The user devices 18a, 18b, and 18c, illustrated as a cordless telephone 18a, a fax machine 18b having an attached telephone, and an analog telephone 18c, are referred to herein as "skinny clients", defined as devices that are able to interface with a user to provide voice and/or data services (e.g., via a modem) but cannot perform any control of the associated access subnetwork.

The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, are referred to as tiny clients. "Tiny clients" are distinguishable from skinny clients in that the tiny clients tend to have even less functionality in providing input and output interaction with a user, rely exclusively on the executable application in an access subnetwork to initiate communications; in addition, tiny clients may not be able to send or receive audio signals such as voice signals at all.

Hence, the skinny clients 18a, 18b, and 18c and the tiny clients 18d, 18e, and 18f access the unified voice messaging services in the unified network 60 via a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18a and telephone 18c would receive analog audio signals played by the proxy browser 62 and no text information (unless a display is available); the fax machine 18b and pager 18f would only receive data/text information, and the cellular telephone 18d and the handheld computing device 18e would receive both voice and data information. Hence, the proxy browser 62 interfaces between the IP network and the respective local access devices for the skinny clients and the tiny clients to provide access to the unified messaging network 60.

Figure 2:
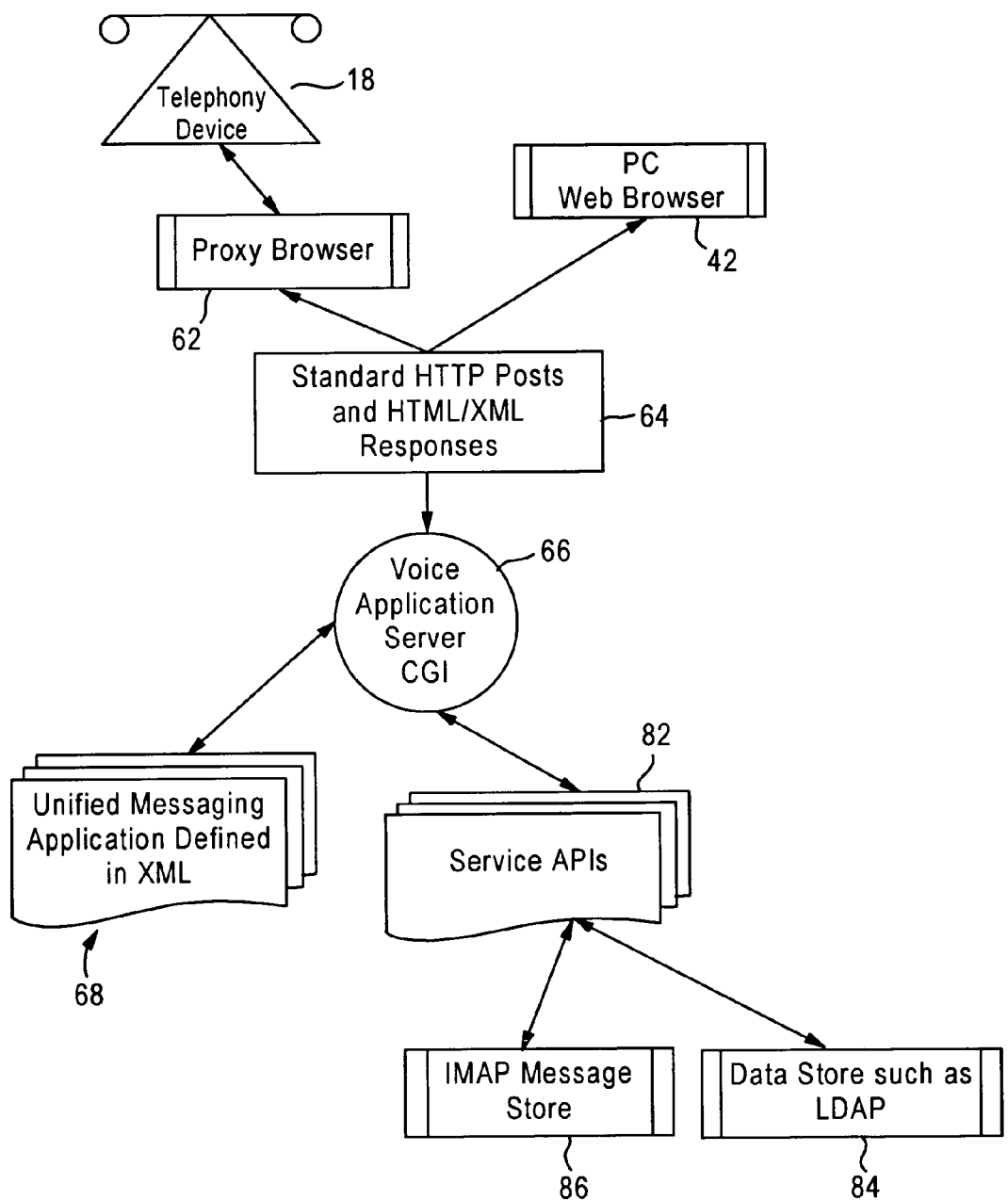
FIG. 2 is a diagram illustrating interactions by the application server of FIG. 1 with resources via an IP network for execution of voice messaging services according to an embodiment of the present invention.

The proxy browser 62 and the web browsers 56 within the fat client 42a and the thin client 42b execute voice enabled web applications by sending data and requests to a web server 64, and receiving hypertext markup language (HTML) web pages from the web server 64, according to hypertext transport protocol (HTTP). The web server 64 serves as an interface between the browsers and an application server 66 that provides an executable runtime environment for XML voice applications 68. For example, the web server 64 may access the application server 66 across a common gateway interface (CGI) as illustrated in FIG. 2, by issuing a function call across an application programming interface (API), or by requesting a published XML document or an audio file requested by one of the browsers 56 or 62. The application server 66, in response to receiving request from the web server 64, may either supply the requested information in the form of an HTML page having XML tags for audio control by a voice resource within the browser, or may perform processing and return a calculated value to enable the browser 56 or 62 to perform additional processing.

The application server 66 accesses selected stored XML application pages 68 (i.e., XML pages that define an application) and in response generate new HTML pages having XML tags during runtime and supply the generated HTML pages having XML tags to the web server 64. Since multiple transactions may need to occur between the browser 56 or 62 and the application server 66, the application server 66 is configured for storing for each existing user session a data record, referred to as a "brownie", that identifies the state of the existing user session; hence, the application server 66 can instantiate a procedure, return the necessary data, and terminate the procedure without the necessity of maintaining the instance running throughout the entire user session.

Hence, the application server 66 executes voice application operations from a stored XML document based on a transient application state, where the application server 66 terminates the application instance after outputting the generated XML media information to the browser 18 or 42.

FIG. 2 is a diagram illustrating in further detail the unified messaging system implemented by the voice application server 66 according to an embodiment of the present invention. As described above expect to FIG. 1, the application server 66 receives, via the web server 64, HTTP requests from either a PC-based web browser 42 capable of supplying full media content (e.g., audio, text, images, and streaming video), or a proxy browser 62 configured for serving as an HTTP interface for a user input device, such as a telephone 18, having limited media capabilities (e.g., audio only). In response to receiving the HTTP requests, the voice application server 66 accesses a selected XML document 68 based on parameters specified within the HTTP request (e.g., commands specified within the URL), and based on application state determined from accessing a brownie, assuming the HTTP request specifies a valid session identifier. As described below, the application runtime environment within the voice application server 66 parses the XML tags within the accessed XML document 68, and dynamically generates an HTML page having XML tags that specify media content (e.g., .wav files) and control information for playing the media files by the corresponding browser.

The voice application server 66 is configured for accessing service application programming interfaces (API's) 82 to external resources based on prescribed procedures that may be called during parsing of an XML tags in a selected XML document 68. As described below, the application server 66 issues function calls to an API 82 for accessing the external resources for prescribed operations, enabling the deployment of a robust, scalable unified messaging system having messaging operations distributed across multiple platforms. In particular, the application server 66 accesses calling number information from an IP-based database server 84 according to LDAP protocol. As described below, the application server 66 is configured for storing and retrieving voice messages in the LDAP server 84 or alternatively in an IMAP messaging server 86.

FIG. 3 is a diagram illustrating in detail the application server 66 according to an embodiment of the present invention. The application server 66 is implemented as a server executing a PHP hypertext processor with XML parsing and processing capabilities, available open source on the Internet at http://www.php.net. As shown in FIG. 3, the server system 66 includes an XML parser 94 configured for parsing the application-defining XML documents 68 stored in the XML document database 72, or the XML documents (i.e., "brownies") stored in the registry 92 and configured for specifying the state and attributes for respective user sessions. The application server 66 also includes a high speed interface 96 that establishes a high-speed connection between the application server 66 and the web server 64. For example, the PHP hypertext processor includes a high-speed interface for Apache Web servers.

The application server 66 also includes a runtime environment 100 for execution of the parsed XML documents. As described above, the runtime environment 100 may selectively execute any one of user interface operation 98, a logic operation 102, or a procedure call 104 as specified by the parsed XML document by executing a corresponding set of executable functions based on the rule set for the corresponding operation. In particular, the application runtime environment 100 includes a tag implementation module 110 that implements the XML tags parsed by the XML parser 94. The tag implementation module 110 performs relatively low-level operations, for example dynamically generating an XML menu page using executable functions specified by a menu rule set in response to detecting a menu tag, performing a logical operation using executable functions specified by a logic rule set in response to a decision tag, or fetching an audio (.wav) file in response to detecting a sound tag. Hence, the tag implementation module 110 implements the tag operations that are specified within the XML framework of the stored XML documents.

The application server 66 also includes a set of libraries 82 that may be implemented as dynamically linked libraries (DLLs) or application programming interface (API) libraries. The libraries 82 enable the runtime environment 100 to implement the procedures 104 as specified by the appropriate XML document. For example, the application server 66 may issue a function call to one of a plurality of IP protocol compliant remote resources 84, or 86 according to LDAP protocol or IMAP Protocol, respectively, described below. For example, the PHP hypertext processor includes executable routines capable of accessing the IMAP or LDAP services. Note that the mechanisms for accessing the services 84, or 86 should be established within the application server before use of XML documents that reference those services.

Once the services 84 or 86 are established, the application runtime environment 100 can perform a function operation by using executable functions specified by a function call rule set.

The arrangement for playing a personalized messaging prompt for a caller based on calling number information will now be described as employed in a unified messaging application.

Figure 4:
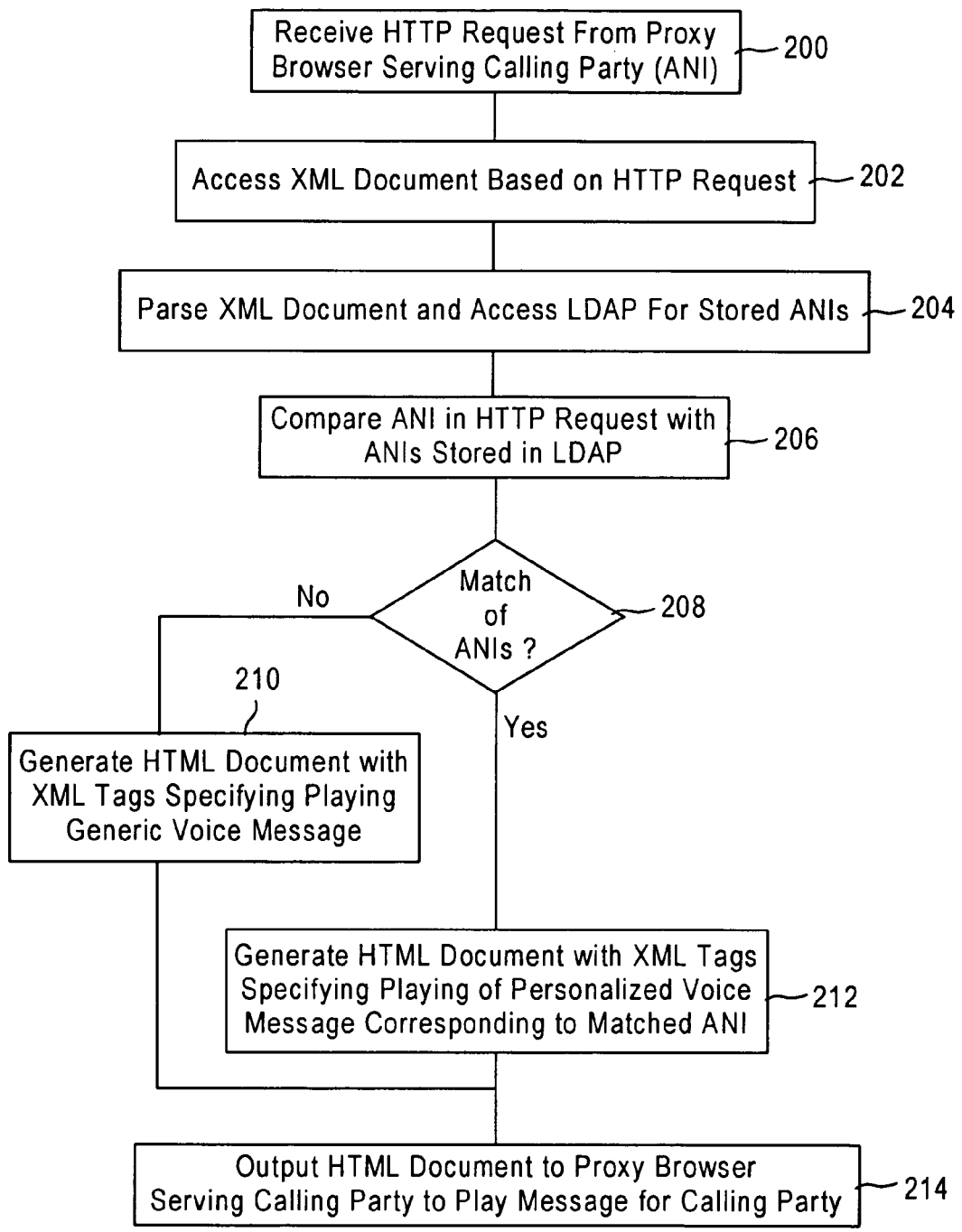
FIG. 4 is a diagram illustrating the execution of voice messaging system operations according to an embodiment of the present invention.

FIG. 4 is a diagram illustrating messaging operations executed by the application server 66 according to an embodiment of the present invention. The steps described in FIG. 4 can be implemented as executable code stored on a computer readable medium (e.g., a hard disk drive, a floppy drive, a random access memory, a read only memory, an EPROM, a compact disc, etc.).

FIG. 4 illustrates operations executed by the application server 66 in initiating a messaging operation for a calling party. As shown in FIG. 4, the application server 66 receives in step 200 an HTTP request from the proxy browser 62 for initiation of a session enabling a calling party to connect with the voice mail of a subscriber to receive a voice greeting message and to leave a message. As shown in step 200, the application server 66 receives from the proxy browser 62 the dialed number identification string (DNIS) of the subscriber and the calling number (ANI) of the calling party. These parameters are obtained by the proxy browser during interaction with a corresponding telephony device, such as a TNT server. In addition, the DNIS and the ANI may be passed as part of the URL specified in the HTTP post by the proxy browser 62.

The application server 66 responds to the HTTP request in step 202 by accessing a selected XML document 68 from the document database 72 based on the command specified in the HTTP request.

Figure 5:
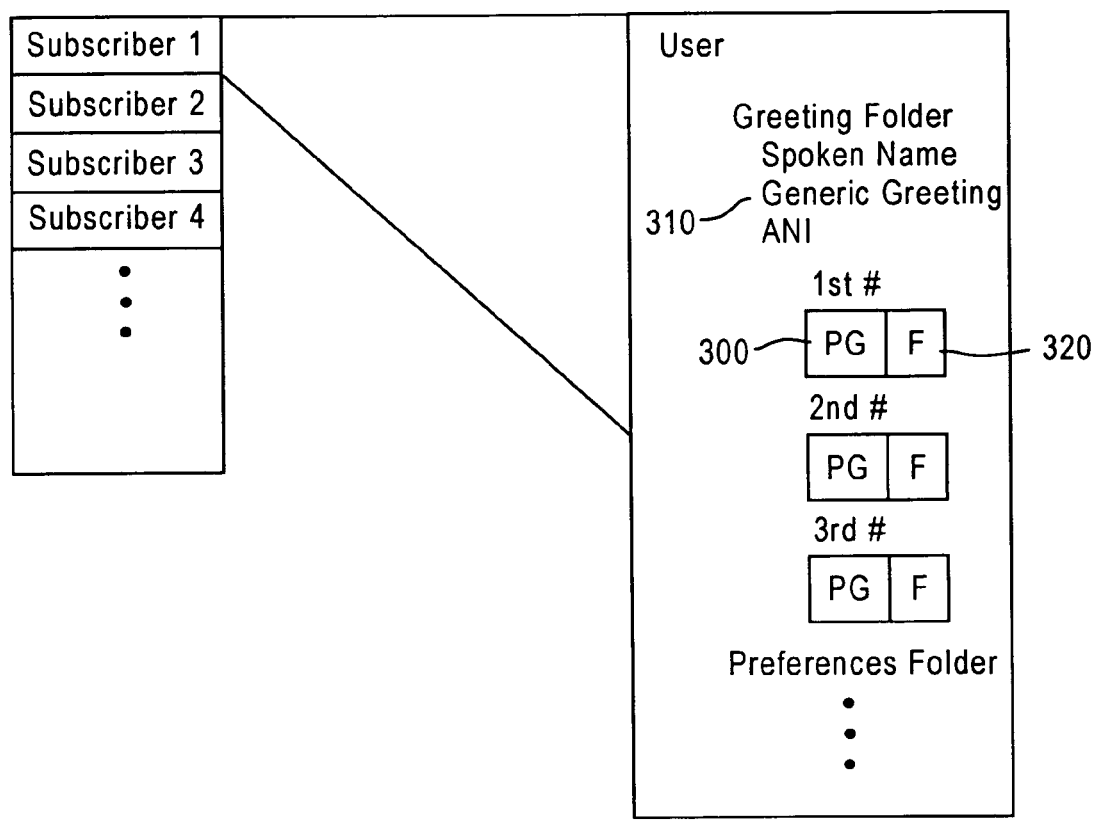
FIG. 5 is a diagram of the LDAP directory storage structure of the invention.

The application server 66 then parses the selected XML document 68, which specifies a function call to the LDAP directory 84. In particular, the application server 66 accesses in step 204 the subscriber profile in the subscriber's directory in LDAP based on the DNIS. FIG. 5 shows the LDAP directory storage structure which includes a greeting folder containing a generic greeting and the ANI listing together with the personalized greeting and flag, the function of which will be explained below. Thus, in step 204 the LDAP directory 84 is accessed so as to compare in step 206 the ANI with ANIs stored in the LDAP directory 84. As shown in FIG. 5, a personalized greeting 300, pre-recorded by the subscriber or called party corresponding to one or more ANIs, is also stored in the LDAP directory 84 or alternatively in the IMAP directory 86. For example, if a subscriber's friend is expected to call from calling number 408-555-555, the subscriber can correspond this number to a message such as, "Hello Joe, I just left. Meet me at the golf course". More than one calling number or portion thereof (e.g. area code) may correspond with a personalized voice message. For example, all calls from area code 408 can correspond to the same voice message.

With reference to FIG. 5, step 208 determines if there is a match between the received ANI and the ANIs stored in the LDAP directory 84. If there is no match, the application server 66 in step 210 generates an HTML document with XML tags specifying playing a generic message 310 previously recorded by the subscriber. If there is a match, the application server 66 in step 212 generates an HTML document with XML tags specifying playing the personalized, pre-recorded message 300 corresponding to the matched ANI. In step 214, the HTML page (corresponding to the personalized message or the generic message) is outputted to the proxy browser 62 to play the message to the caller.

Flags 320 (FIG. 5) can also be set to correspond to the stored ANI. The flags 320 may, for example, permit certain callers to single-number-reach the subscriber or permit certain callers to page the subscriber. According to the disclosed embodiment, a subscriber can record personal voice messages corresponding to the identity of the calling party so that when the calling party calls the subscriber and reaches the subscriber's voice mail, the personalized voice message will be played. In addition, the subscriber is enabled to set up different scenarios (via flags) based on the ANI. For example, a subscriber may want to avoid a call from a telemarketer but may want to use SNR in the case of a co-worker calling to discuss an upcoming meeting.

Furthermore, voice mail and unified messaging services may be deployed on a platform that is customizable, scalable, and built upon open standards such as Internet protocol. Unified voice messaging services can be implemented by information service providers without the necessity of telephony based voice mail systems that rely on proprietary telephony protocols.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an application server for playing a messaging prompt of a called party to a calling party, the method comprising:

receiving calling party number information specifying a calling party;

accessing stored calling party number information from an Internet Protocol (IP) based database server configured for storing calling party number information;

comparing the received calling party number information to the stored calling party number information to determine if there is a match between the received calling party number information and the stored calling party number information;

based on a determined match of the stored calling party number information identifying the calling party as a matched calling party, retrieving a personalized voice message in a recorded voice of the called party corresponding to the matched, stored calling party number information, for playback as the messaging prompt to the matched calling party, the personalized voice message containing a greeting specifically for the matched calling party, and if there is no match between the received calling party number information and the stored calling party number information, retrieving a generic voice message, different from the personalized voice message, as playback as the messaging prompt to the calling party.

2. The method of claim 1, wherein the received and stored calling party number information each includes at least a portion of a telephone number of the calling party.

3. The method of claim 1, wherein the accessing step includes accessing the IP-based database server according to lightweight directory access protocol.

4. The method of claim 1, wherein the retrieving step includes accessing the personalized voice message stored in the IP-based database server according to lightweight directory access protocol.

5. The method of claim 1, wherein the retrieving step includes retrieving the stored personalized voice message from the IP based database server.

6. The method of claim 1, wherein the step of receiving calling party number information includes receiving an HTTP request from the calling party, the HTTP request containing the calling party number information.

7. The method of claim 6, further including generating an HTML page having XML tags for specifying playing of the personalized voice message.

8. The method of claim 7, wherein the step of generating the HTML page includes inserting a first media tag including a .wav file and a second media tag configured for controlling playing of the .wav file.

9. The method of claim 1, further including corresponding a flag to certain of the stored calling party number information, the flag indicating a calling feature defined by a called party for use by the calling party.

10. The method of claim 9, wherein the calling feature defines one of a paging operation and a single number reach operation.

11. The method of claim 1, further including receiving a dialed number identification string (DNIS), and wherein the accessing step includes accessing a subscribers' profile based on the DNIS, the subscriber's profile including the stored calling party number information and the corresponding personalized voice message.

12. A messaging system for playing a messaging prompt of a called party to a calling party in response to a request for execution of a messaging operation, the request containing calling party number information, the messaging system including:
an application runtime environment configured for retrieving, for playback as the messaging prompt to the calling party, (1) a personalized voice message in a recorded voice of the called party based on a match of the received calling party number information with calling party number information stored in an Internet Protocol (IP) based database server, the match identifying a matched calling party, the personalized voice message corresponding to the matched, stored calling number information of the matched calling party, the personalized voice message containing a greeting specifically for the matched calling party, or (2) a generic voice message, different from the personalized voice message, when there is no match of the received calling party number information with calling party number information stored in the Internet Protocol (IP) based database server.

13. The system of claim 12, wherein the application runtime environment is configured to access a subscribers' profile based on a dialed number identification string (DNIS), the subscriber's profile including the stored calling party number information and the corresponding personalized voice message.

14. The system of claim 12, wherein the application runtime environment is configured to access the IP-based database server according to protocol.

15. The system of claim 12, wherein the received and stored calling party number information each includes at least a portion of a telephone number of the calling party.

16. The system of claim 12, wherein the application runtime environment is configured to dynamically generate in response to the request, a hypertext markup language (HTML) document having XML tags specifying playing of the personalized voice message.

17. The system of claim 16, wherein the application runtime environment is configured to generate the HTML page including inserting a first media tag including a .wav file and a second media tag configured for controlling playing of the .wav file.

18. A computer readable medium having stored thereon sequences of instructions for an application server to perform playing a messaging prompt of a called party to a calling party, the sequence of instructions including instructions for performing the steps of:
receiving calling party number information specifying a calling party;
accessing stored calling party number information from an Internet Protocol (IP) based database server configured for storing calling party number information;
comparing the received calling party number information to the stored calling party number information to determine if there is a match between the received calling party number information and the stored calling party number information; and
based on a determined match of the stored calling party number information identifying the calling party as a matched calling party, retrieving a personalized voice message having a recorded voice of the called party corresponding to the matched, stored calling party number information, for playback as the messaging prompt to the matched calling party, the personalized voice message containing a greeting specifically for the matched calling party, and
if there is no match between the received calling party number information and the stored calling party number information, retrieving a generic voice message, different from the personalized voice message, as playback as the messaging prompt to the calling party.

19. The medium of claim 18, wherein the received and stored calling party number information each includes at least a portion of a telephone number of the calling party.

20. The medium of claim 18, wherein the accessing step includes accessing the IP-based database server according to lightweight directory access protocol.

21. The medium of claim 18, wherein the retrieving step includes accessing the personalized voice message stored in the IP-based database server according to lightweight directory access protocol.

22. The medium of claim 18, wherein the retrieving step includes retrieving the stored personalized voice message from the IP based database server.

23. The medium of claim 18, wherein the step of receiving calling party number information includes receiving an HTTP request from the calling party, the HTTP request containing the calling party number information.

24. The medium of claim 23, further including generating an HTML page having XML tags for specifying playing of the personalized voice message.

25. The medium of claim 24, wherein the step of generating the HTML page includes inserting a first media tag including a .wav file and a second media tag configured for controlling playing of the .wav file.

26. The medium of claim 18, further including corresponding a flag to certain of the stored calling party number information, the flag indicating a calling feature defined by a called party for use by the calling party.

27. The medium of claim 26, wherein the calling feature defines one of a paging operation and a single number reach operation.

28. The method of claim 18, further including receiving a dialed number identification string (DNIS), and wherein the accessing step includes accessing a subscriber's profile based on the DNIS, the subscriber's profile including the stored calling party number information and the corresponding personalized voice message.

29. A messaging system for playing a messaging prompt of a called party to a calling party in response to a request for execution of a messaging operation, the request containing calling party number information, the messaging system including:

means for storing a personalized, voice message having a recorded voice of the called party, and a generic voice message different from the personalized voice message, and means for retrieving, for playback as the messaging prompt to the calling party, (1) the personalized voice message based on a match of the received calling party number information with calling party number information stored in an Internet Protocol (IP) based database server, the match identifying a matched calling party, the personalized voice message corresponding to the matched, stored calling number information of the matched calling party, the personalized voice message containing a greeting specifically for the matched calling party or (2) the generic voice message when there is no match of the received calling party number information with calling party number information stored in the Internet Protocol (IP) based database server.

30. The system of claim 29, wherein the retrieving means is configured to access the IP-based database server according to lightweight directory access protocol.

31. The system of claim 29, wherein the received and stored calling party number information each includes at least a portion of a telephone number of the calling party.

32. The system of claim 29, wherein the retrieving means is configured to dynamically generate in response to the request, a hypertext markup language (HTML) document having XML tags specifying playing of the personalized voice message.

33. The system of claim 32, wherein the retrieving means is configured to generate the HTML page including inserting a first media tag including a .wav file and a second media tag configured for controlling playing of the .wav file.

34. The system of claim 29, wherein the retrieving means is configured to access a subscribers' profile based on a dialed number identification string (DNIS), the subscriber's profile including the stored calling party number information and the corresponding personalized voice message.

* * * * *